March 10, 1936.  H. C. EDDY  2,033,418

ELECTRIC TREATER FOR EMULSIONS

Filed April 6, 1932

INVENTOR:
Harold C. Eddy,
By

ATTORNEY.

Patented Mar. 10, 1936

2,033,418

UNITED STATES PATENT OFFICE 2,033,418

ELECTRIC TREATER FOR EMULSIONS

Harold C. Eddy, Los Angeles, Calif., assignor to Petroleum Rectifying Company of California, Los Angeles, Calif., a corporation of California Application April 6, 1932, Serial No. 603,513

7 Claims. (Cl. 204—24)

My invention relates to the art of electric treatment of liquids, and more particularly to novel improvements in the art of separating the constituents of a petroleum emulsion.

The action of a high-potential electric field in coalescing the dispersed water droplets of a petroleum emulsion is well known. In one form of treater it has been proposed to utilize one or more downward extending electrodes provided with pointed ends, these ends being spaced from the surface of a body of water maintained in the lower portion of the treater tank. A very intense discharge is thus set up from the pointed end of each electrode utilized, this discharge tending to treat the emulsion and to move the water particles downward due to the intense discharge or electric blast. Such a treater is shown and claimed in a copending application of Harmon F. Fisher, Serial No. 577,997.

It has been found, however, that in some instances the operation of such a treater is quite unstable when treating to a water level, and it is an important object of the present invention to position an auxiliary electrode adjacent this water level and toward which the electrode discharge takes place.

The auxiliary electrode is preferably positioned a short distance above the water level so that the discharge takes place to the auxiliary electrode rather than to the surface of the body of water. In effecting this condition it is desirable to be able to regulate the relative positions of the water level and this auxiliary electrode, and it is another important object of the invention to provide a system in which this can be readily accomplished.

Apparently, the more stable operation is effected through the action of a pointed electrode directed toward but spaced from an electrode maintained at a different potential. It is a further object of this invention to provide an electrode system for an electric treater in which an auxiliary electrode is positioned in the path of an electric discharge taking place from a pointed electrode.

Still further objects of the invention lie in the constructional details herein disclosed, and will be apparent to those skilled in the art from the following description.

Referring to the drawing,—

Figure 1:
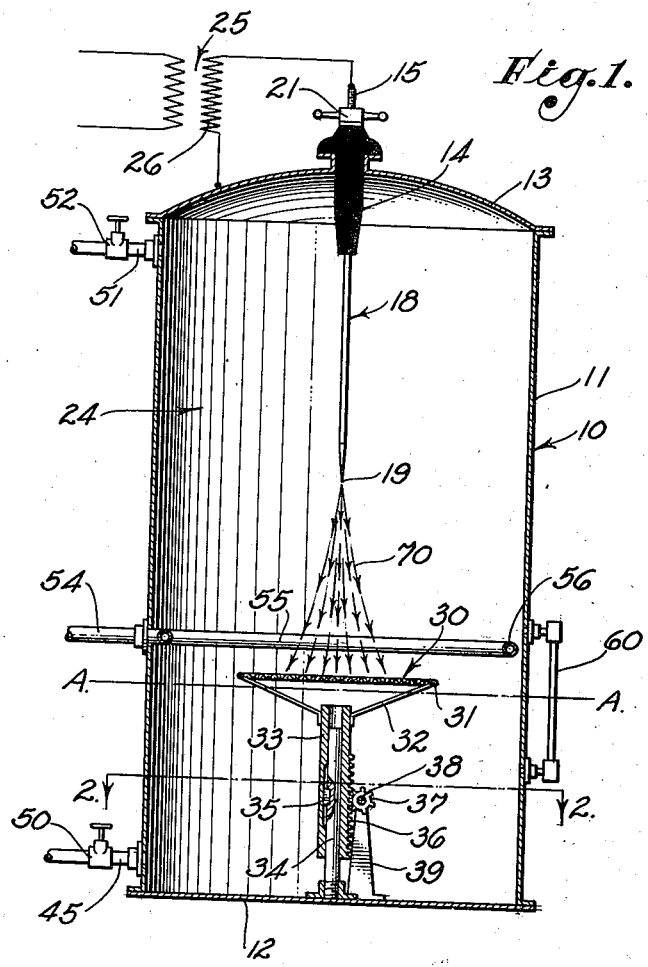
Fig. 1 is a vertical sectional view of the preferred embodiment of the invention.

Referring particularly to Fig. 1, I have illustrated a tank 10 including a shell 11 closed at its lower end by a lower head 12, and at its upper end by an upper head 13.

Extending through the upper head 13 is an insulator 14 surrounding a rod 15 which extends therethrough and into the interior of the tank 10 to define a live electrode 18, the lower end of which provides a sharp point 19. The upper end of the rod 15 is threaded, and a manually operable nut 21 is threaded thereon and engages the upper end of the insulator 14 so that by turning this nut the electrode 18 can be raised or lowered.

A main treating space 24 is defined between the electrode 18 and the shell 11 and a main electric field is established in this space by a suitable high-potential source such as a transformer 25. This transformer is shown as having a secondary winding 26, one terminal of which is connected to the live electrode 18 and the other terminal of which is grounded to the tank 10.

Not only is an electric field set up in the treating space 24 by a connection such as shown in Fig. 1, but in addition a very intense electric discharge is set up immediately below the point 19 due to the sharpness of the lower end of the live electrode. One mode of operating such a treater is to maintain a body of water in the lower portion of the tank so that the electric discharge or blast from the point 19 is directed downward toward the water level, the water itself acting as a grounded electrode due to its contact with the tank 10. I have found that such a system is quite critical and requires constant attention to maintain constant conditions in the tank 10. One condition which must be maintained constant with such a system is the water level, while another condition which apparently makes the treater unstable is the varying nature of the constituents in the electric discharge below the point 19.

It is an important feature of my invention to utilize an auxiliary electrode adjacent the water level whereby the operation of the treater is stabilized. Such an auxiliary electrode is shown in Fig. 1 as comprising a lower or grounded electrode 30 which extends across the projected axis of the live electrode 18, or which, in other words, extends across the discharge taking place from the point 19. It is preferable, though not in all cases necessary, to utilize a flat electrode in this capacity, and to provide suitable perforations therein so that the water particles which are moved downward due to the intense electric discharge can move through these perforations and into the body of water in the lower portion of the treater.

Figure 2:
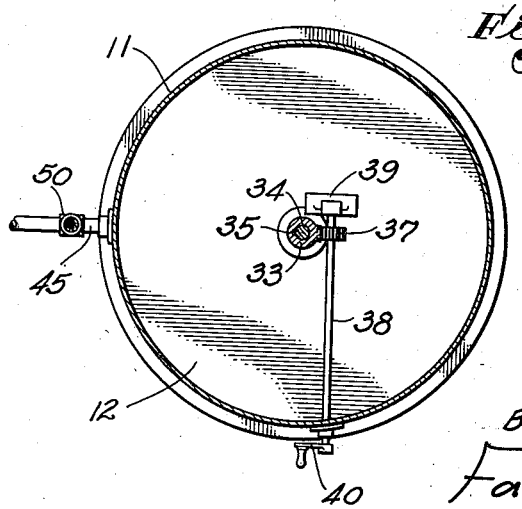
Fig. 2 is a sectional view of the treater taken on the line 2—2 of Fig. 1.

In the form of the invention shown in Fig. 1, I have illustrated the electrode 30 as comprising a metallic screen mounted in a wire frame 31 supported on arms 32. These arms are in turn welded or otherwise secured to a sleeve 33 which is vertically slidable on a post 34 suitably secured to the lower head 12 of the tank so that the electrode 30 is grounded. It is preferable to be able to adjust the vertical position of the electrode 30. This may readily be done by sliding the sleeve 33 vertically with respect to the post 34. A key 35 may be utilized to prevent rotation of the electrode 30 relative to the post 34. One means of accomplishing this end is to form teeth 36 on the sleeve 33, these teeth meshing with a pinion 37 mounted on a shaft 38 extending through the shell 11 and journalled in a bearing standard 39. Suitable means is provided outside of the tank for turning the shaft 38, such means being illustrated in Fig. 2 as comprising a crank 40. By thus turning the crank the vertical position of the lower electrode 30 can be changed.

The treater includes the conventional draw-off means which may comprise a water discharge pipe 45 including a valve 50 and an oil draw-off pipe 51 including a valve 52, these pipes respectively communicating with the lower and upper ends of the tank 10. Various means of introducing the emulsion into the tank can be used. In Fig. 1 I have shown an intake pipe 54 communicating with an annular pipe 55 including upwardly directed openings 56 which force the emulsion upward and into the main field set up in the treating space 24.

In the practical operation of the device, the water level is maintained adjacent the lower electrode 30, and preferably at a section A—A just below the upper surface of the lower electrode 30. The position of this water level can be readily changed by varying the relative amounts of oil and water flowing through the pipes 51 and 45. The position of this level can be indicated in any conventional manner. Diagrammatically such a means is illustrated in Fig. 1 as comprising a level indicating gauge 60. It is, of course, understood that other devices well known in the art might be substituted. So also, it is in some instances desirable to utilize automatic means for maintaining this water level substantially constant. Such means may, for instance, be of the type disclosed in the patent to Harris, No. 1,405,120.

In the practical operation of the device, the treater may be operated as a batch treater or a continuous treater. In either event the lower end of the tank contains a body of water, the emulsion being above the water level and in the treating space 24. When the transformer 25 is energized two quite distinct treating actions are effected. In the first place, the emulsion in the treating space 24 is treated by the main field therein, most of this treatment taking place in the vicinity of the live electrode 18 due to the fact that the field thereadjacent is very intense because of the concentric nature of the electrodes defining this main field. The water particles in the emulsion coalesce into larger masses which tend to gravitate downward. The electric blast or discharge set up below the point 19 acts to effectuate a second treatment of any material thereadjacent, and tends to force this material downward due to the intense blast. This blast is indicated in Fig. 1 by arrows 70, and, as previously pointed out, the discharge takes place to the lower electrode 30 rather than to the surface defined at the water level. Thus, instead of treating from a point to a water level the present invention treats from a point to an auxiliary electrode surface adjacent the water level and so positioned as to stabilize the operation of the treater. It will be understood that any water particles which are moved downward due to the intense discharge from the point 19 can move directly into the body of water below the level A—A through the interstices of the electrode 30 in the event that an interstitial electrode is utilized.

It is extremely desirable to be able to change the relative positions of the electrode 30 and the level A—A. This may be done either by controlling the vertical position of the level A—A by operation of the valves 50 and 52 or by turning the shaft 38 by means of the crank 40. It is usually preferable to maintain the upper surface of the electrode 30 only a slight distance above the level A—A.

If treatment between the point 19 and the water level A—A is attempted, without the use of the stabilizing electrode 30, it will be found extremely difficult to maintain constant conditions in the dehydrator. For instance, it is very difficult to maintain constant current conditions. Slight changes in the position of the water level greatly change the amount of current consumed, as does also any change in the relative amounts of the constitutents in the electric blast below the point 19. These factors both work toward unstable operation. For instance, if the water level is too low the requisite gradient is not established so that incomplete treatment takes place. This of course changes the constitutents in the electric blast and greatly increases the current consumed, which in turn lowers the voltage and thus the voltage gradient applied to the emulsion. If the condition is not promptly remedied by the operator, the current will reach short-circuiting proportions and treatment will be entirely destroyed. Further, it is extremely difficult to start the operation of such a treater for the constituents present in the electric blast are quite different from those present during continuous operation.

When, however, the electrode 30 of my invention is used the position of the water level is not critical. The discharge takes place to the electrode rather than to the water level so that an inadvertent change in this level will not upset the stability of operation. Further, the voltage gradient between the point 19 and the electrode 30 can be maintained substantially constant, thereby effecting constant treatment which prevents a change in the relative amounts of the constitutents in the electric blast and thus gives constant cuts from the top of the treater. Operation of a treater without the electrode 30 has adequately shown that it is difficult and often impossible to maintain constant cuts. Finally, the electrode 30 greatly assists in starting up the treater.

The spacing between the point 19 and the electrode 30 can be adjusted by changing the position of either the electrode 18 or the electrode 30 or both. This adjustment is often of value when the treater is first put into operation, but is most often used to compensate for different emulsions undergoing treatment. Some emulsions are more effectively treated at an electrode spacing different from the electrode spacing which most effectively treats other emulsions.

During continuous operation it will be found that the emulsion and water do not always separate distinctly at a single distinct plane. Instead, the water content gradually increases near the level A—A shown in Fig. 1. However, in the absence of the lower electrode 30 there will be a rather definite water level to which treatment takes place when the treater is used to effect a continuous process. It is this level that is indicated by the letters A—A. The best position of the electrode 30 is just above this level, and this position can be determined empirically by raising the electrode to a position where a stable operation takes place.

It will be understood that the important feature of this invention resides in the setting up of an electric discharge between electrodes one of which is pointed. If the grounded electrode is positioned near the water level to which treatment would otherwise take place, it will be found that a much more stable operation will result. Finally, it should be understood that various means may be utilized for keeping this level adjacent the electrode. In this connection, the position of the water level itself may be changed or the vertical position of the electrode 30 may be changed, or a combined change in these factors may be utilized in securing the desired adjustment.

It should be understood that the showing herein is for illustrative purposes only and that I am not limited to the particular structure disclosed.

I claim as my invention:

1. In combination in an electric treater for treating emulsions: a tank containing the emulsion to be treated and a body of water; a lower electrode surface in said tank at a position adjacent the level of said water in said tank and extending transversely across a vertical axis in said tank; a rod electrode extending downward in said tank coaxial with said vertical axis toward said lower electrode surface whereby said electrode surface extends outward from the projected axis of said rod electrode, the lowermost end of said rod electrode being pointed whereby an electric field set up between said rod and said lower electrode surface is highly concentrated adjacent said pointed end and forms a discharge directed downward toward said lower electrode surface but diverging from said projected axis toward portions of said electrode surface surrounding said projected axis, said lower electrode surface being positioned slightly above the water level to which the discharge would take place in the absence of said lower electrode surface whereby said discharge takes place to said lower electrode surface rather than to said body of water, and means for establishing a high potential difference between said rod electrode and said lower electrode surface.

2. A combination as defined in claim 1 in which said lower electrode surface is formed of metal and is perforated whereby the water moved downward by said discharge can move through the perforations and into the body of water immediately below said lower electrode.

3. In combination in an electric treater for treating emulsions: a grounded tank containing the emulsion to be treated and containing a body of water in the lower end thereof; a live electrode in the form of a rod extending vertically downward in said tank; means for insulating said live electrode from said tank whereby a main field is set up therebetween when a potential difference is established therebetween; a lower grounded electrode means positioned directly below the lower end of said live electrode, said lower end of said live electrode being pointed to direct a discharge downward to the upper surface of said lower electrode means, said upper surface being positioned slightly above the water level to which said discharge would take place in the absence of said lower grounded electrode means whereby said discharge takes place to said upper surface rather than to the surface of said body of water; means above said lower grounded electrode means for continuously introducing the emulsion to be treated into said tank at a level above said lower grounded electrode means and thus into said main field; and means for developing a potential difference between said live electrode and said grounded tank and lower electrode means whereby said emulsion is first treated by said main field and then by said discharge to move the water of said emulsion downward toward said lower electrode means.

4. In combination in an electric treater: a tank containing the emulsion to be treated; a vertically extending rod electrode positioned in said emulsion and providing a relatively sharp point at one end; an interstitial electrode in said tank and spaced longitudinally from the pointed end of said rod electrode and extending across the projected axis thereof whereby an electric field formed between said rod electrode and said metallic electrode is highly concentrated adjacent said pointed end and forms a discharge directed toward said metallic electrode to treat the liquid mixture therebetween, said discharge forcing liquid particles from the vicinity of said relatively sharp point toward said interstitial electrode, said liquid particles moving from said electric field through said interstices, thereby preventing an accumulation of said liquid particles on said interstitial electrode as would be the case if this electrode was not of interstitial character and thus preventing decrease in size of the effective field-including space in which said discharge is established; and means for establishing a high potential between said rod electrode and said metallic electrode.

5. In combination in an electric treater for treating emulsions: a tank containing at one end a body of a separated phase liquid of said emulsion of conducting nature and containing at the other end a body of another separated phase liquid of said emulsion of a relatively non-conducting nature, the zone between said bodies being filled with a loose emulsion undergoing gravitational separation; a vertically extending electrode in said tank and providing a relatively sharp terminal portion on one end thereof, said terminal portion being vertically directed toward but spaced from that body of phase liquid of a conducting nature whereby a portion of said loose emulsion separates said terminal portion and said body of phase liquid of a conducting nature; an electrode means positioned in said portion of loose emulsion between said terminal portion and said body of phase liquid of a conducting nature and extending across the projected axis of said vertically-extending electrode; and means for establishing a potential difference between said terminal portion and said electrode means to form an intense electric discharge from said terminal portion toward said electrode means.

6. A combination as defined in claim 8 in which said electric discharge is of sufficient intensity to violently propel liquid particles toward said electrode means, and in which said electrode means is of an interstitial character whereby said liquid particles may pass through the interstices of said electrode means and thence directly into said body of phase liquid of a conducting nature.

7. In combination in an electric treater for treating emulsions: a tank containing the emulsion to be treated and a body of water; a lower electrode surface in said tank at a position adjacent the level of said water in said tank; a rod electrode extending downward in said tank toward said lower electrode surface, the lowermost end of said rod electrode being pointed whereby an electric field set up between said rod and said lower electrode surface is highly concentrated adjacent said pointed end and forms a discharge directed downward toward said lower electrode surface, said lower electrode surface being positioned slightly above the water level to which the discharge would take place in the absence of said lower electrode surface whereby said discharge takes place to said lower electrode surface rather than to said body of water; means for establishing a high potential difference between said rod electrode and said lower electrode surface; means for moving said electrode surface vertically to change the spacing between said electrode surface and the lower end of said rod electrode; and means for changing the position of said water level.

HAROLD C. EDDY.